(12) United States Patent
Hori et al.

(10) Patent No.: US 7,532,774 B2
(45) Date of Patent: May 12, 2009

(54) INTERPOLATION PIXEL GENERATION CIRCUIT

(75) Inventors: Yasuhiro Hori, Tokyo (JP); Koichi Sato, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 642 days.

(21) Appl. No.: 11/185,786

(22) Filed: Jul. 21, 2005

(65) Prior Publication Data

US 2006/0018564 A1 Jan. 26, 2006

(30) Foreign Application Priority Data

Jul. 21, 2004 (JP) .............................. 2004-212359

(51) Int. Cl.
*G06K 9/32* (2006.01)

(52) U.S. Cl. ..................................... 382/300

(58) Field of Classification Search ................. 384/448, 384/452, 458, 607, 700; 382/266, 300
See application file for complete search history.

(56) References Cited

U.S. PATENT DOCUMENTS

| 4,985,764 | A | | 1/1991 | Sato |
| 5,032,899 | A | | 7/1991 | Sato |
| 5,786,862 | A | * | 7/1998 | Kim et al. .................... 348/448 |
| 6,215,527 | B1 | * | 4/2001 | Okamoto et al. ............. 348/625 |
| 6,356,310 | B1 | * | 3/2002 | Horishi et al. ............... 348/458 |
| 6,731,342 | B2 | | 5/2004 | Shin et al. |
| 6,795,123 | B2 | | 9/2004 | Gotanda et al. |
| 6,924,844 | B2 | * | 8/2005 | Kawamura et al. ........... 348/448 |
| 7,039,254 | B1 | * | 5/2006 | Maenaka et al. ............. 382/300 |
| 2001/0008425 | A1 | * | 7/2001 | Shin et al. .................... 348/452 |
| 2002/0080269 | A1 | * | 6/2002 | Gotanda et al. .............. 348/448 |
| 2004/0263684 | A1 | | 12/2004 | Tanaka |
| 2008/0080790 | A1 | * | 4/2008 | Hori et al. .................... 382/300 |

FOREIGN PATENT DOCUMENTS

WO  WO 02/37847  *  5/2002

* cited by examiner

*Primary Examiner*—Samir A. Ahmed
*Assistant Examiner*—Mekonen Bekele
(74) *Attorney, Agent, or Firm*—Oblon, Spivak, McClelland, Maier & Neustadt, P.C.

(57) ABSTRACT

In an interpolation pixel generation circuit, M pairs and N pairs (N<M) of correlation judgment pixels are generated from pixels on at least two scanning lines which adjoin a pixel to be interpolated, using one pair of pixels being symmetric with respect to the pixel to be interpolated. A correlation value between pixel values of a correlation judgment pair is calculated in each M pairs and N pairs of correlation judgment pixels. Correlation judging pairs having high correlation are selected, and correlation direction is judged. Based on the both judged correlation direction of M pairs and the N pairs of correlation judgment pixels, an interpolation priority direction is determined from a slant priority direction, a vertical priority direction, and a vertical top priority direction. An interpolation pixel is generated, which pixel value is an average of pixel values of the selected correlation judgment pixels being in the determined direction.

16 Claims, 11 Drawing Sheets

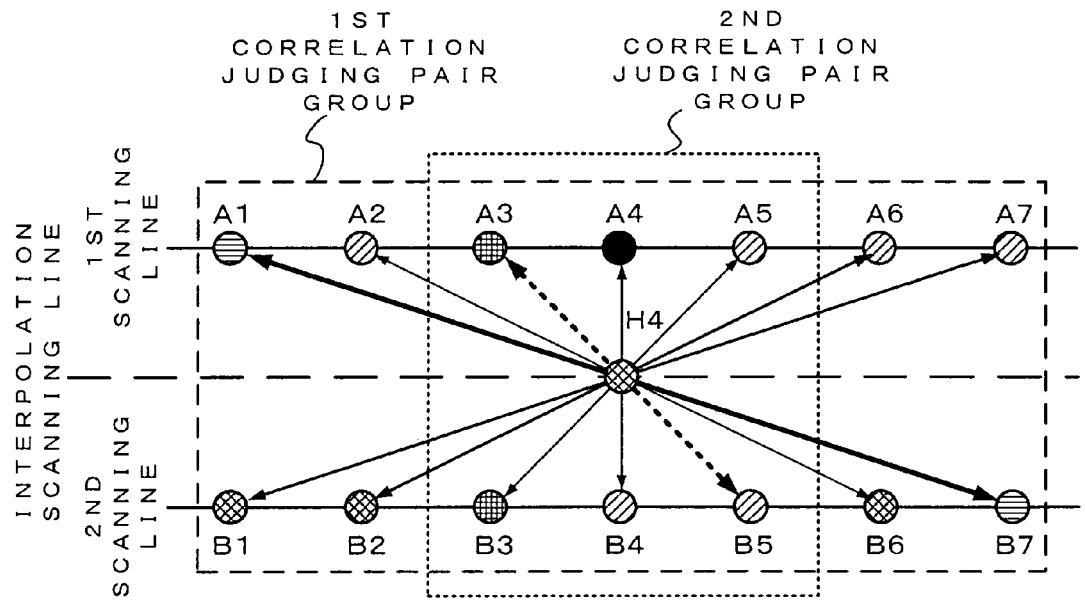
F I G. 7A
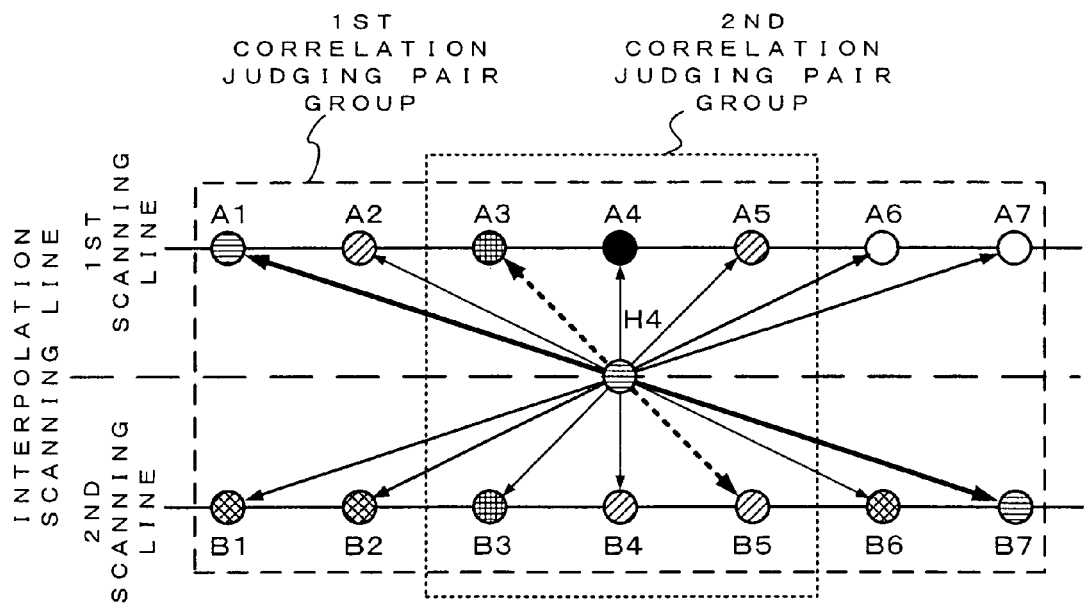
F I G. 7B

US 7,532,774 B2

INTERPOLATION PIXEL GENERATION CIRCUIT

CROSS REFERENCE TO RELATED APPLICATION

This patent application claims the benefit of priority from Japanese Patent Application No. 2004-212359, filed on Jul. 21, 2004; the content of which is incorporated herein by reference in its entirety.

FIELD OF THE INVENTION

The present invention relates to an interpolation pixel generation circuit which generates an interpolation pixel between adjoining scanning lines.

DESCRIPTION OF THE BACKGROUND

In such a plasma display device or a liquid crystal display, an image is displayed on scanning lines sequentially as a line of pixels located on each scanning line.

In order to improve quality of the image displayed on the scanning lines, interpolation pixels are generated on each interpolation scanning line produced between two adjoining scanning lines.

For example, as a circuit which generates interpolation pixels, Japanese Laid-Open Patent Publication No. 2003-230109 discloses a circuit which detects a direction where correlation of pixel values is the highest from pixels on adjoining scanning lines, and generates a pixel value of the interpolation pixel by calculating the average of pixel values of the pixels of the detected direction.

However, when calculating the average of the pixel values of the above pixels with the highest correlation, differences of pixel values between the interpolation pixel and each pixel which adjoin the interpolation pixel may become large, and the interpolation pixel may cause a noise problem.

For example, when pixels having the highest correlation are high luminance, the generated interpolation pixel is also high luminance. So, if all other surrounding pixels are low luminance, the height of luminance of the interpolation pixel is conspicuous as a noise.

SUMMARY OF THE INVENTION

One aspect of the present invention is to provide an interpolation pixel generation circuit which comprises a first calculation means for calculating a correlation value of each pair of pixels in M pairs (M is an integer) of correlation judgment pixels, said each pair of pixels being symmetric with respect to a pixel to be interpolated, one pixel of said each pair being from a video signal on a previous scanning line, and the other pixel of said each pair being from a video signal on a current scanning line, a second calculation means for calculating a correlation value of each pair of pixels in N pairs (N<M, N is an integer) of correlation judgment pixels, said each pair of pixels being symmetric with respect to the pixel to be interpolated, one pixel of said each pair being from the video signal on the previous scanning line, and the other pixel of said each pair being from the video signal on the current scanning line, a first judgment means for judging a correlation direction based on the pair of pixels having a high correlation among the correlation values calculated in the first calculation means, a second judgment means for judging a correlation direction based on the pair of pixels having a high correlation among the correlation values calculated in the second calculation means, an interpolation priority direction determination means for determining an interpolation priority direction among a slant priority direction, a vertical priority direction, and a vertical top priority based on said both judgments by the first judgment means and the second judgment means, and an interpolation pixel generation means for generating an interpolation pixel having a pixel value which is an average pixel value of a pair of pixels selected for interpolation from the M pairs of correlation judgment pixels and the N pairs of correlation judgment pixels based on the determination of the interpolation priority direction determination means.

BRIEF DESCRIPTION OF THE DRAWINGS

FIG. 7A and FIG. 7B show examples of a correlation pixel generated in the second embodiment.

DETAILED DESCRIPTION OF THE EMBODIMENTS

Embodiments of the present invention will be explained in reference to the drawings as follows. In these embodiments, luminance is used as an example of a pixel value.

First Embodiment

Figure 1:
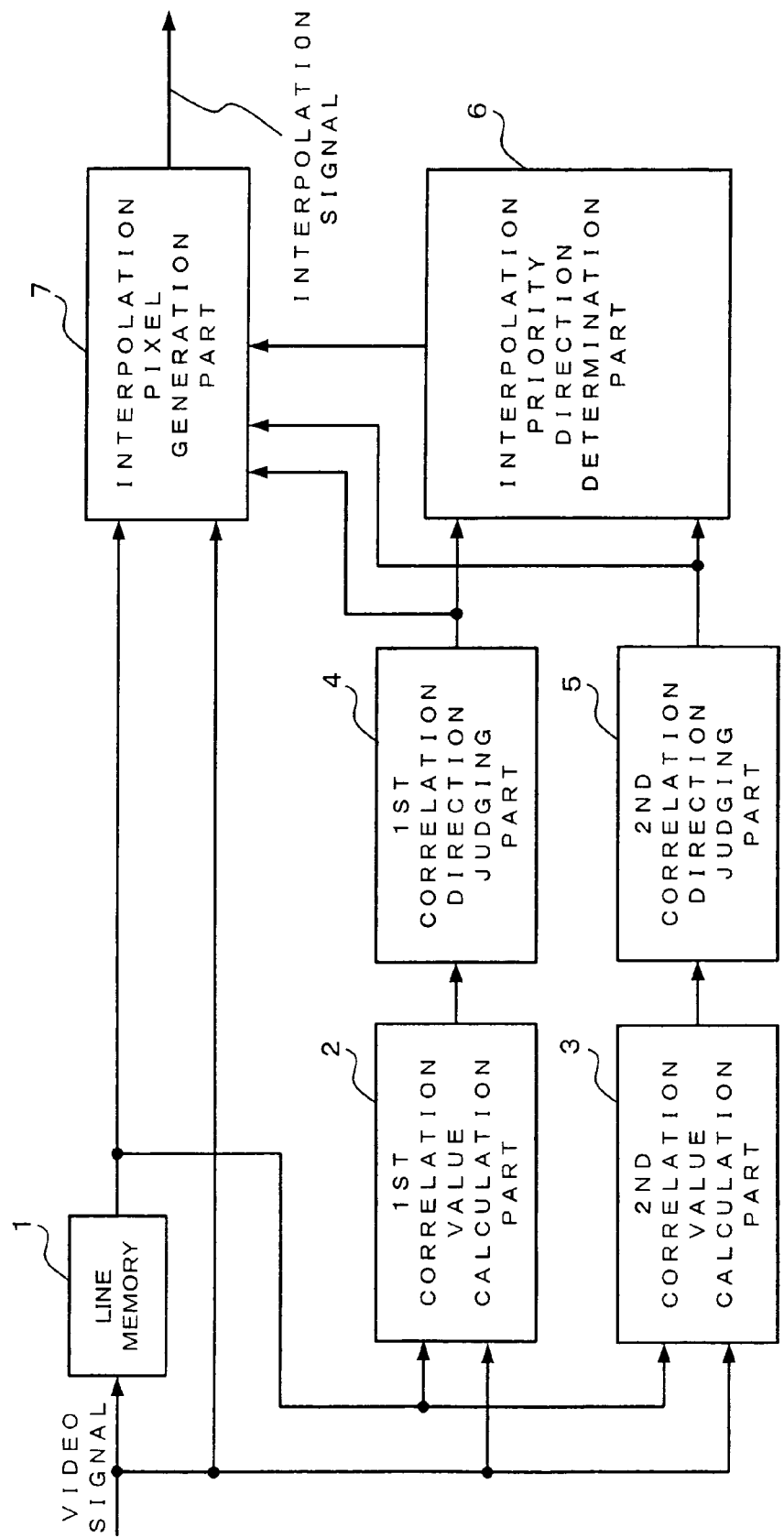
FIG. 1 is a block diagram showing a first embodiment of an interpolation pixel generation circuit according to the present invention.

FIG. 1 is a block diagram showing an example of a composition of an interpolation pixel generation circuit of a first embodiment.

An interpolation pixel generation circuit of this embodiment includes a line memory 1, a first correlation value calculation part 2, a second correlation value calculation part 3, a first correlation direction judging part 4, a second correlation direction judging part 5, an interpolation priority direction determination part 6, and an interpolation pixel generation part 7.

The line memory 1 stores a video signal for one scanning line from an inputted video signal. Therefore, the video signal stored in the line memory 1 is a video signal of a previous scanning line which prior to the current scanning line.

The first correlation value calculation part 2 takes out one pair of pixels from the video signal stored in the line memory 1 and the video signal of the current scanning line as one set of correlation judging pair, and calculates each correlation value between pixel values about M pairs (M is an integer) of correlation judgment pixels.

The second correlation value calculation part 3 takes out one pair of pixels from the video signal stored in the line memory 1 and the video signal of the current scanning line as one set of correlation judging pair, and calculates each correlation value between pixel values about N pairs (N<M, N is an integer) of correlation judgment pixels.

The first correlation direction judging part 4 selects a high correlation judging pair out of the above mentioned M pairs based on the correlation value calculated in the first correlation value calculation part 2, and judges a correlation direction between the video signal stored in the line memory 1 and the video signal of the current scanning line.

The second correlation direction judging part 5 selects a high correlation judging pair out of the above mentioned N pairs based on the correlation value calculated in the second correlation value calculation part 3, and judges a correlation direction between the video signal stored in the line memory 1 and the video signal of the current scanning line.

The interpolation priority direction determination part 6 determines the interpolation direction to which priority should be given based on the both judgment results of the first correlation direction judging part 4 and the second correlation direction judging part 5.

The interpolation pixel generation part 7 generates an interpolation pixel on an interpolation scanning line equivalent to the middle position of the current scanning line and the previous scanning line using the video signal stored by the line memory 1 and the video signal of the current scanning line based on the judgment of both the first correlation direction judging part 4 and the second correlation direction judging part 5, and the determination of the interpolation priority direction determination part 6.

Figure 2:
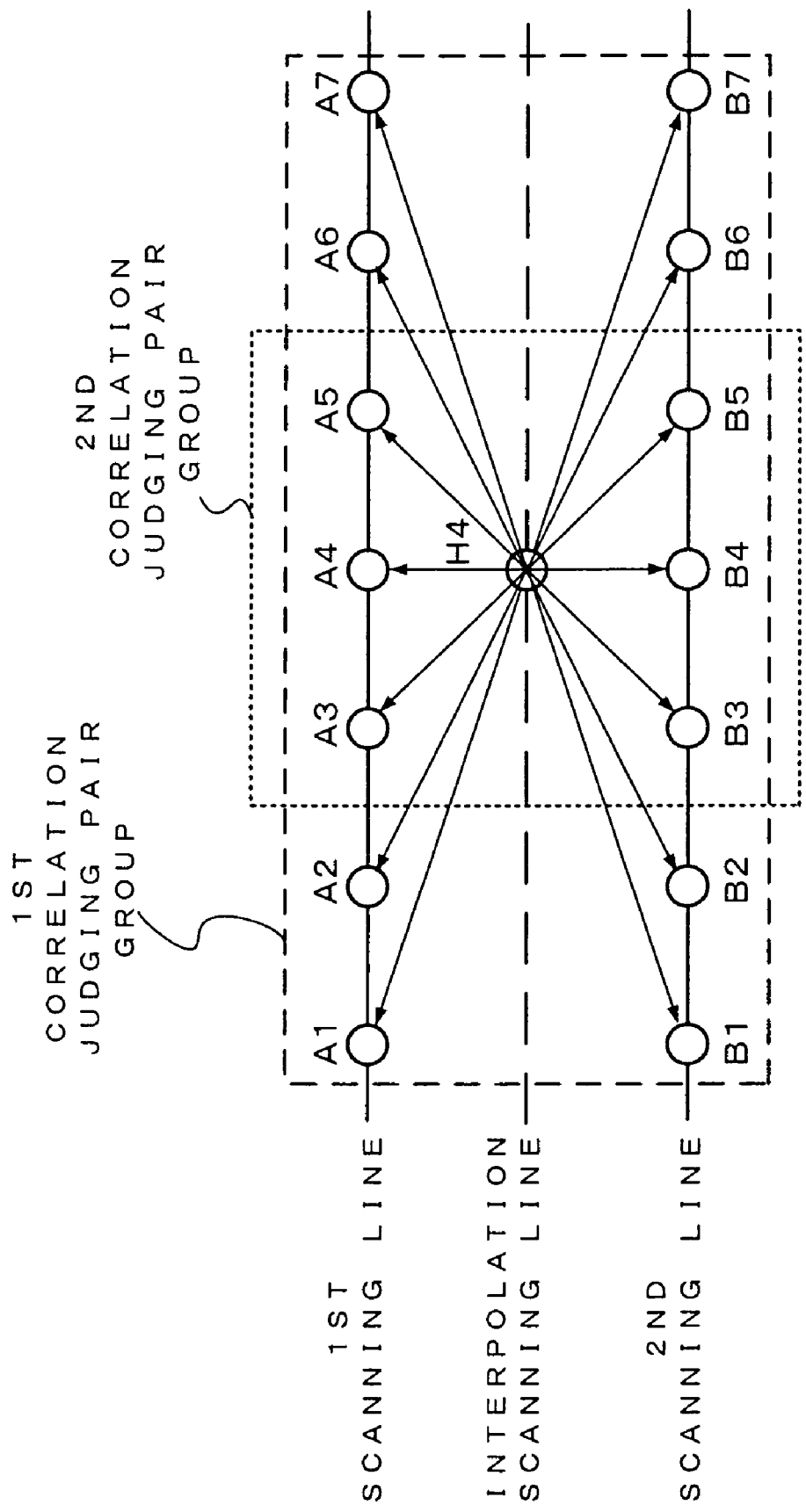
FIG. 2 shows an example of correlation judging pair groups of the first embodiment.

FIG. 2 is a figure showing an example of correlation judging pair in the present embodiment. In this example, M pairs of correlation judgment pixels which the first correlation value calculation part 2 uses is called a first correlation judging pair group, and N pairs of correlation judgment pixels which the second correlation value calculation part 3 uses is called a second correlation judging pair group. And, the example set to M=7 and N=3 is shown.

In FIG. 2, pixels of the video signal outputted from the line memory 1 on a first scanning line which is a previous scanning line are expressed as A1, A2, A3, A4, A5, A6 and A7. Pixels of the same horizontal position as A1-A7 of a video signal on a second scanning line which is the current scanning line are expressed as B1, B2, B3, B4, B5, B6, and B7. And, an interpolation pixel H4 which is one of interpolation pixels generated on an interpolation scanning line located in the middle of the first scanning line and the second scanning line is a pixel to be interpolated in the middle position of the pixel A4 and the pixel B4.

In order to generate the interpolation pixel H4, one set of correlation judging pair is formed of a pixel of the first scanning line and a pixel of the second scanning line which are symmetric with respect to the interpolation pixel H4. The first correlation judging pair group has seven sets of correlation judging pairs, and the second correlation judging pair group has three sets of correlation judging pairs.

For example, when it expresses correlation judging pair formed by the pixel A1 and the pixel B7 as (A1, B7), the first correlation judging pair group consists of (A1, B7), (A2, B6), (A3, B5), (A4, B4), (A5, B3), (A6, B2), and (A7, B1), and the second correlation judging pair group consists of (A3, B5), (A4, B4), and (A5, B3).

Then, a line which connects between the pixels of each correlation judging pair is called a correlation direction. And, the correlation direction of the correlation judging pairs (A1, B7), (A2, B6), and (A3, B5) is called a downward-slant-to-the-right direction, the correlation direction of the correlation judging pairs (A5, B3), (A6, B-2), and (A7, B1) is called an upward-slant-to-the-right direction. It is said that the downward-slant-to-the-right direction and the upward-slant-to-the-right direction are the correlation directions which counter mutually.

Moreover, the correlation direction of correlation judging pairs (A1, B7), (A7, B1), (A2, B6), and (A6, B2) which connects pixels A1 and B7, A7 and B1, A2 and A6, and B6 and B2 in a distance far from the interpolation pixel H4, is called a large slant direction.

Therefore, the first correlation judging pair group including judging pairs having the large slant direction is suitable for using for the correlation judging which gives priority to the direction of slant.

On the other hand, since the second correlation judging pair group is generating correlation judging pair including pixels which adjoined the interpolation pixel H4, it is suitable for a correlation judging of a direction near the vertical direction of the interpolation pixel H4. That is, the second correlation judging pair group is suitable for the correlation judging which gives priority to the vertical direction.

Referring to FIG. 3A-FIG. 5, an example of an interpolation pixel generation by an interpolation pixel generation circuit of the present embodiment is explained.

Figure 3A:
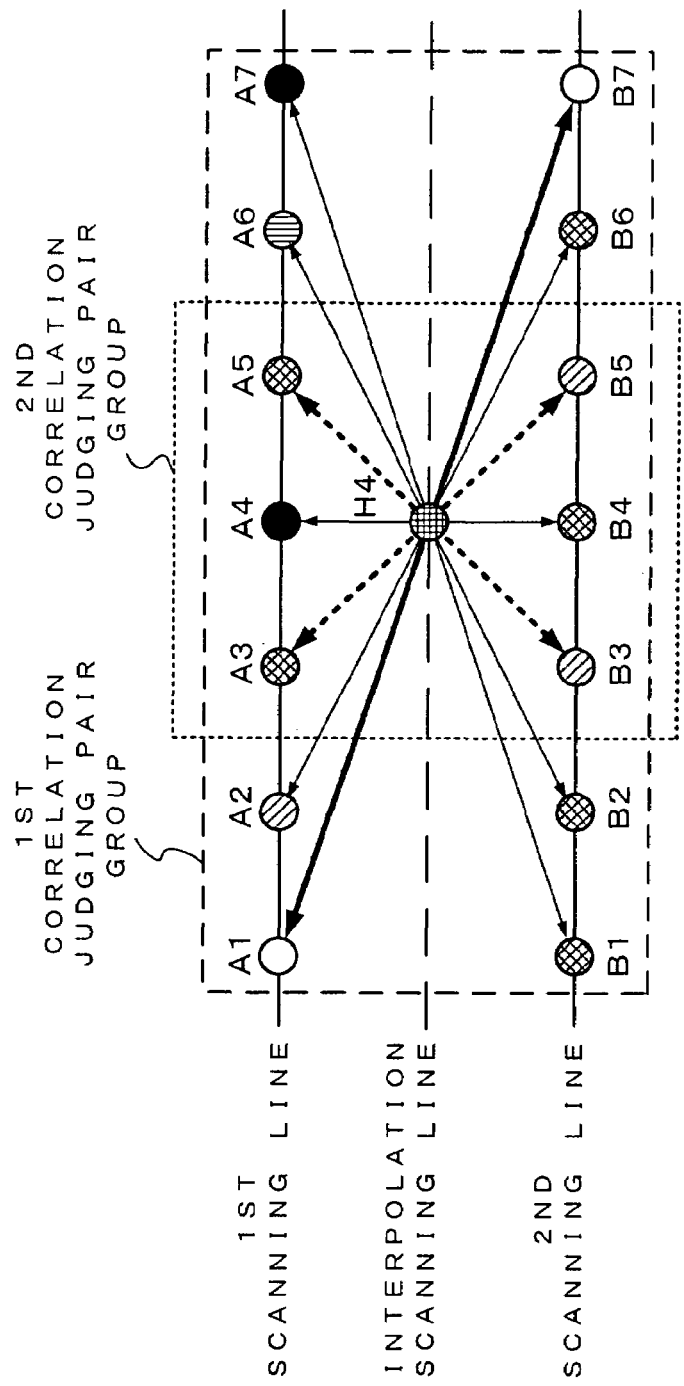
FIG. 3A and FIG. 3B show examples of a correlation pixel generated in the first embodiment.
Figure 3B:
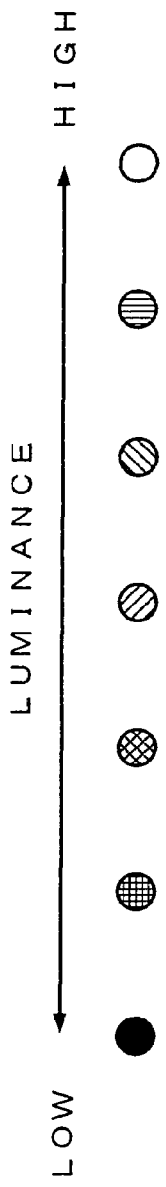

FIG. 3A shows an example of pixels A1-A7 and pixels B1-B7 with luminance according to FIG. 3B.

FIG. 3B shows steps of luminance. Black expresses the lowest luminance and white expresses the highest luminance. And, patterns of circles represent difference of luminance.

To pixels A1-A7 and pixels B1-B7 which are shown in FIG. 3A, the first correlation value calculation part 2 calculates correlation values of seven correlation judging pairs of the first correlation judging pair group, and the second correlation value calculation part 3 calculates correlation values of three correlation judging pairs of the second correlation judging pair group.

Here, a correlation value of each correlation judging pair is expressed with an absolute value of a difference of luminance between pixels of the correlation judging pair. For example, when the luminance of the pixel A1 is expressed as a1 and the luminance of the pixel B7 is expressed as b7, the correlation value of correlation judging pair (A1, B7) is |a1−b7|.

Then, the first correlation direction judging part 4 selects a correlation judging pair which has a high correlation value from the first correlation judging pair group based on the correlation value calculated in the first correlation value calculation part 2, and judges the correlation direction in the first correlation judging pair group. Similarly, the second correlation direction judging part 5 selects a correlation judging pair which has a high correlation value from the second correlation judging pair group based on the correlation value calculated in the second correlation value calculation part 3, and judges the correlation direction in the second correlation judging pair group.

Here, a correlation judging pair which has a high correlation value means that the luminance of two pixels forming the correlation judging pair have values near each other. That is, as the correlation value of correlation judging pair is smaller, correlation of the correlation judging pair is higher.

In the example of FIG. 3A, the first correlation direction judging part 4 judges that the correlation judging pair (A1, B7) has high correlation, and the second correlation direction judging part 5 judges the correlation judging pairs (A1, B7) and (A5, B3) has high correlation respectively.

Next, the interpolation priority direction determination part 6 determines to which interpolation direction priority should be given. At this time, the interpolation priority direction determination part 6 confirms whether there are two or more correlation directions judged in the second correlation direction judging part 5 first. Next, if the two or more correlation directions are included, the interpolation priority direction determination part 6 will confirm whether both the downward-slant-to-the-right direction and the upward-slant-to-the-right direction are included in them. When there are two or more correlation directions judged in the second correlation direction judging part 5 and both the downward-slant-to-the-right direction and the upward-slant-to-the-right direction are included in them, the interpolation priority direction determination part 6 judges that there is no pixel located in a slanting line near the interpolation pixel H4, and determines to give top priority to the vertical direction as the interpolation direction.

When it is determined that the interpolation priority direction determination part 6 gives top priority to the vertical direction, the interpolation pixel generation part 7 calculates a luminance of the interpolation pixel H4 using the pixels A4 and B4 of the upper and lower sides of the interpolation pixel H4. The luminance of an interpolation pixel H4 is calculated as an average value of luminance of pixels A4 and B4.

If interpolation is performed only by the judgment of a simple correlation value, it is possible that the interpolation pixel H4 with high luminance is generated based on correlation of the correlation judging pair (A1, B7), and it becomes a noise in a case like FIG. 3A. On the other hand, the interpolation pixel H4 generated by the present embodiment cannot become a noise easily.

Figure 4:
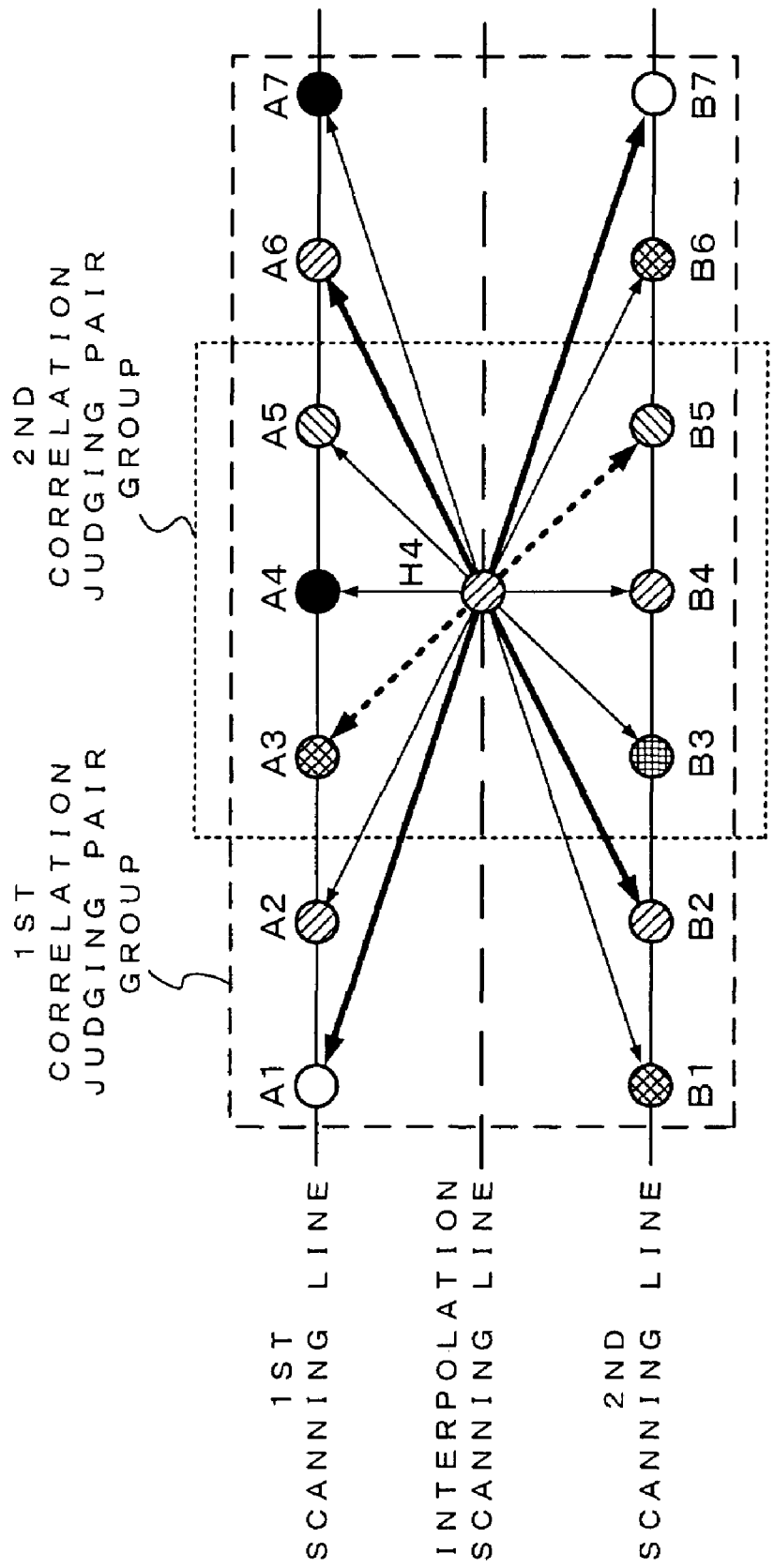
FIG. 4 shows an example of a correlation pixel generated in the first embodiment.

Another example of an interpolation pixel generation by the interpolation pixel generation circuit concerning the present embodiment is shown in FIG. 4.

In the case of lines of pixels having luminance as shown in FIG. 4, the first correlation direction judging part 4 judges that the correlation judging pairs (A1, B7) and (A6, B2) have high correlation respectively, and the second correlation direction judging part 5 judges that the correlation judging pair (A3, B5) has high correlation.

The interpolation priority direction determination part 6 determines to which interpolation direction priority should be given using the judgment results of the first correlation direction judging part 4 and the second correlation direction judging part 5 as follows. First, the interpolation priority direction determination part 6 confirms whether there are two or more correlation directions judged in the 2nd correlation direction judging part 5. In the example shown in FIG. 4, since there is only the one correlation direction judged in the second correlation direction judging part 5, it is judged that the interpolation priority direction is not the vertical direction top priority.

Then, the interpolation priority direction determination part 6 confirms whether there are the two or more correlation directions judged in the first correlation direction judging part 4. If the two or more correlation directions are included, the interpolation priority direction determination part 6 will confirm whether both the downward-slant-to-the-right direction and the upward-slant-to-the-right direction are included in them.

If both the downward-slant-to-the-right direction and the upward-slant-to-the-right direction are included in the directions judged by the first correlation direction judging part 4, it is supposed that the directions of slant are crossing.

In such a case, since it cannot determine to which direction of slant priority is given, the interpolation priority direction determination part 6 determines to give priority to the vertical direction as the interpolation direction.

In the example shown in FIG. 4, there are the two correlation directions judged in the first correlation direction judging part 4, and, the directions are the downward-slant-to-the-right direction of correlation judging pair (A1, B7) and the upward-slant-to-the-right direction of correlation judging pair (A6, B2). Therefore, the interpolation priority direction determination part 6 determines to give priority to the vertical direction as the interpolation direction in this case.

When it is determined that the interpolation priority direction determination part 6 gives top priority to the vertical direction, the interpolation pixel generation part 7 calculates an average of luminance of the pixels of the correlation direction judged by the second correlation direction judging part 5, and makes it the luminance of the interpolation pixel H4. Therefore, in the example shown in FIG. 4, an average luminance value of the pixels A3 and B5 of the correlation direction judged by the second correlation direction judging part 5 is generated as luminance of the interpolation pixel H4.

Second Embodiment

Figure 5:
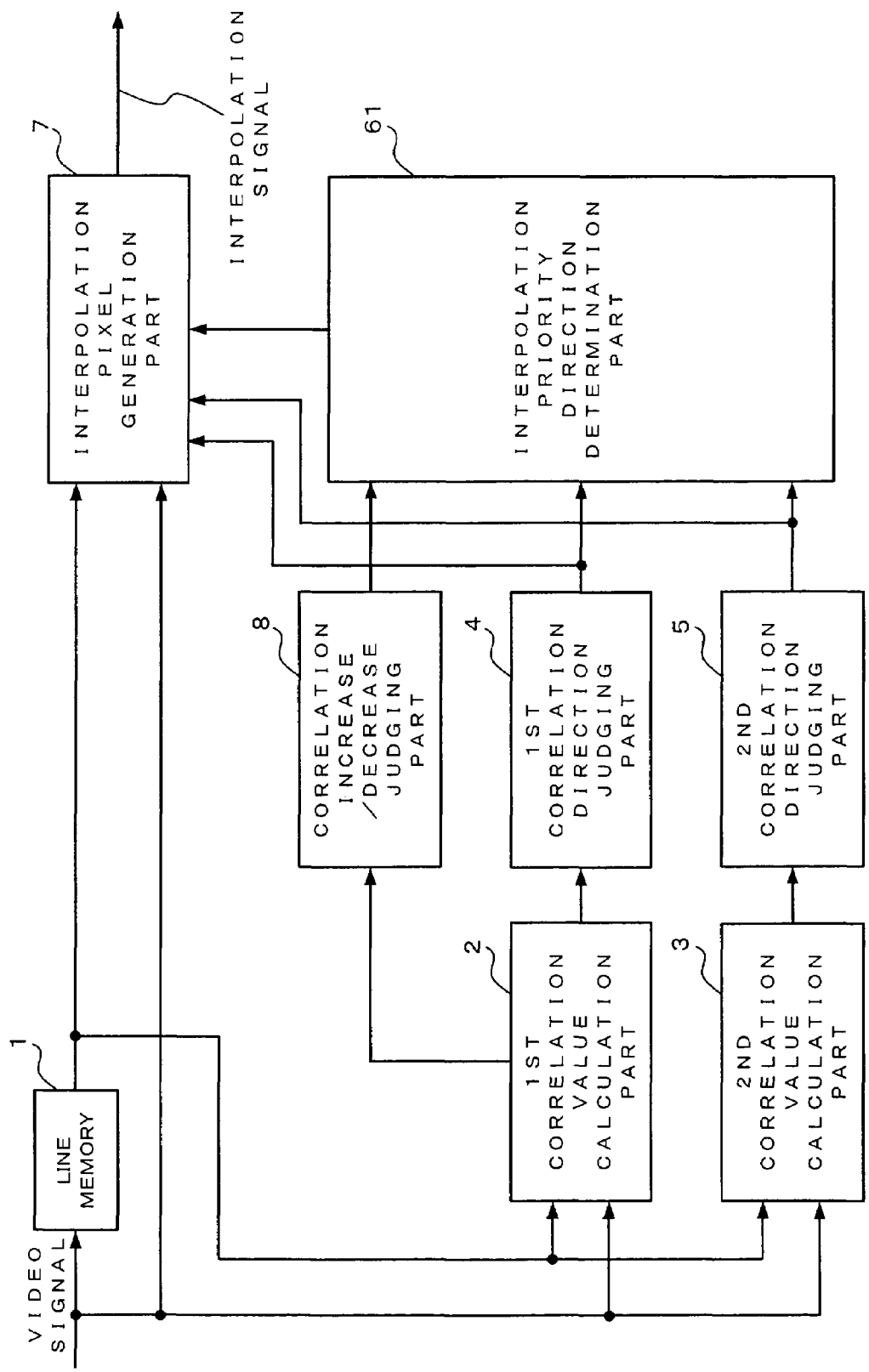
FIG. 5 is a block diagram showing a second embodiment of an interpolation pixel generation circuit according to the present invention.

FIG. 5 is a block diagram showing a second embodiment of an interpolation pixel generation circuit according to the present invention.

In the present embodiment, a correlation increase/decrease judgment part 8 is added to the interpolation pixel generation circuit of the first embodiment shown in FIG. 1. An interpolation priority direction determination part 61 adds further the judgment result of the correlation increase/decrease judgment part 8 to judgment basis, and determines to which interpolation direction priority is given. Then, in FIG. 5, the same reference numeral as FIG. 1 is given to the same block as a block shown in FIG. 1, and the detailed explanation is omitted here.

The correlation increase/decrease judgment part 8 judges whether the number of continuation of correlation judging pairs in which the correlation value is carrying out monotonic increase or monotonic decrease exceeds the predetermined value for the first correlation judging pair group used in the first correlation value calculation part 2.

In the following examples, the luminance of each pixel A1, A2, A3, A4, A5, A6, A7 is expressed as a1, a2, a3, a4, a5, a6, a7 and the luminance of each pixel B1, B2, B3, B4, B5, B6, B7 is expressed as b1, b2, b3, b4, b5, b6, b7, and suppose that the predetermined value used for the judgment of monotonic increase or monotonic decrease is 6. For example, if |a1−b7|>|a2−b6|>|a3−b5|>|a4−b4|>|a5−b3|>|a6−b2| is observed, the correlation increase/decrease judgment part 8 judges that is monotonic increase, and if |a2−b6|<|a3−b5|<|a4−b4|<|a5−b3|<|a6−b2|<|a7−b1| is observed, the correlation increase/decrease judgment part 8 judges that is monotonic decrease.

Figure 6A:
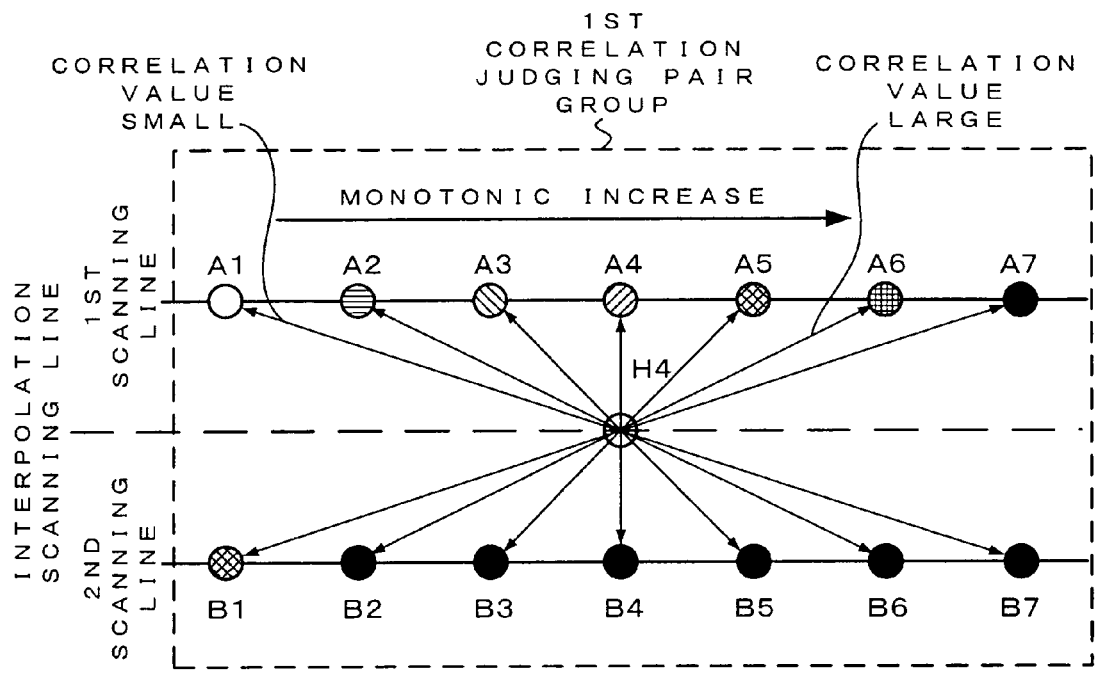
FIG. 6A and FIG. 6B are diagrams for explanation of a correlation increase/decrease judgment part of the second embodiment.
Figure 6B:
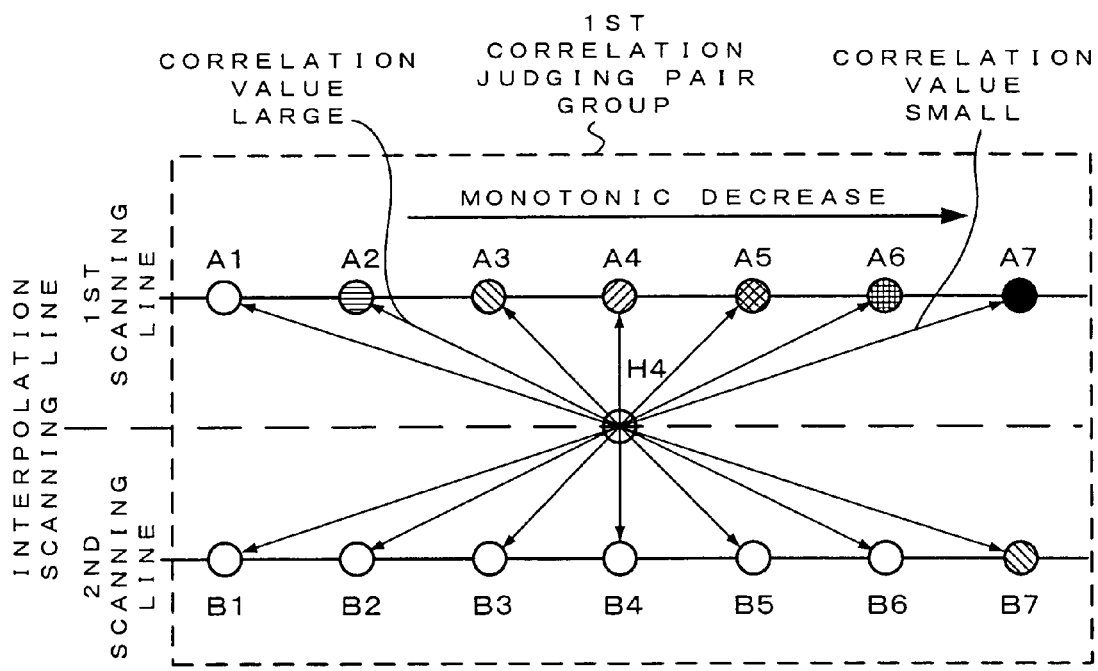

FIG. 6A shows an example of a line of pixels which the correlation increase/decrease part 8 of a judgment judges to be monotonic increase, and FIG. 6B shows an example of a line of pixels which the correlation increase/decrease part 8 of a judgment judges to be monotonic decrease.

As shown in FIG. 6A and FIG. 6B, the luminance of the pixels on one scanning line is almost constant, and the luminance of the pixels on other scanning lines is changing gradually, the correlation increase/decrease judgment part 8 can judge monotonic increase or monotonic decrease. Thus, when the luminance of a line of pixels is changing gradually, it is considered that the luminance difference between the pixels of the both ends of the line is quite large.

On the other hand, when the judgment of the correlation increase/decrease judgment part 8 is neither monotonic increase nor monotonic decrease, the luminance of the pixels in the first correlation judging pair group is considered to change at random.

When the judgment of the correlation increase/decrease judgment part 8 is neither monotonic increase nor monotonic decrease, the interpolation priority direction determination part 61 of the present embodiment generates an interpolation pixel as follows.

The interpolation priority direction determination part 61 confirms first whether the judgment result of the first correlation direction judging part 4 is the direction having large slant. If the judgment result is the large slant direction, the interpolation priority direction determination part 61 extracts all correlation judging pairs which have large slant directions countering the direction of the result of the first correlation direction judging part 4, and calculates the difference values between the each correlation value of the extracted correlation judging pairs, and the correlation value of the correlation judging pair of the direction judged by the first correlation direction judging part 4.

The interpolation priority direction determination part 61 determines to give priority to the vertical direction as the interpolation priority direction in the case in which all difference values are smaller than the predetermined threshold, and, in the other cases, the interpolation priority direction determination part 61 determines to give priority to the slant direction as the interpolation priority direction. The determination is based on an idea that there are also slanting directions which counter the judgment result of the first correlation direction judging part 4 when the difference values are small. In this case, it is better to avoid following the judgment result of the first correlation direction judging part 4.

FIG. 7A and FIG. 7B show examples of an interpolation pixel generation by the interpolation pixel generation circuit of the present embodiment.

In an example of FIG. 7A, a judgment result of the first correlation direction judging part 4 is the direction of correlation judging pair (A1, B7), that is the large slant direction.

Then, the interpolation priority direction determination part 61 evaluates every difference value between the correlation value of every correlation judging pair having the large slant direction which counters to the direction of correlation judging pair (A1, B7). That is, the interpolation priority direction determination part 61 evaluates difference value between the correlation value of correlation judging pair (A7, B1) and (A1, B7), and the difference value between the correlation value of correlation judging pair (A6, B2) and (A1, B7), respectively. When it is judged by the result of the evaluation that every difference value is smaller than the predetermined threshold, the interpolation priority direction determination part 61 determines to give priority to the vertical direction as the interpolation direction.

Since the interpolation priority direction determination part 61 determined the vertical direction priority as the interpolation priority direction, the interpolation pixel generation part 7 calculates the average of the luminance of the pixels existing in the correlation direction judged by the second correlation direction judging part 5 as the luminance of the interpolation pixel H4. Therefore, in the example of FIG. 7A, the luminance of the interpolation pixel H4 is the average value of luminance of the pixel A3 and the pixel B5 which are in the correlation direction judged by the second correlation direction judging part 5.

On the other hand, the example of FIG. 7B as the example of FIG. 7A with the same judgment result of the first correlation direction judging part 4 shows the case where at least one of the difference values of the correlation value between the correlation judging pair (A7, B1) and (A1, B7), or the correlation judging pair (A6, B2) and (A1, B7) exceeds the predetermined threshold. In this case, the interpolation priority direction determination part 61 determines to give priority to the slant direction as the interpolation priority direction.

When it is determined that the interpolation priority direction determination part 6 gives top priority to the vertical direction, the interpolation pixel generation part 7 calculates the average of the luminance of the pixels existing in the correlation direction judged by the second correlation direction judging part 5 as the luminance of the interpolation pixel H4. Therefore, in the example of FIG. 7B, the luminance of the interpolation pixel H4 is the average value of luminance of the pixel A1 and the pixel B7 which are in the correlation direction judged by the second correlation direction judging part 5.

Third Embodiment

Figure 8:
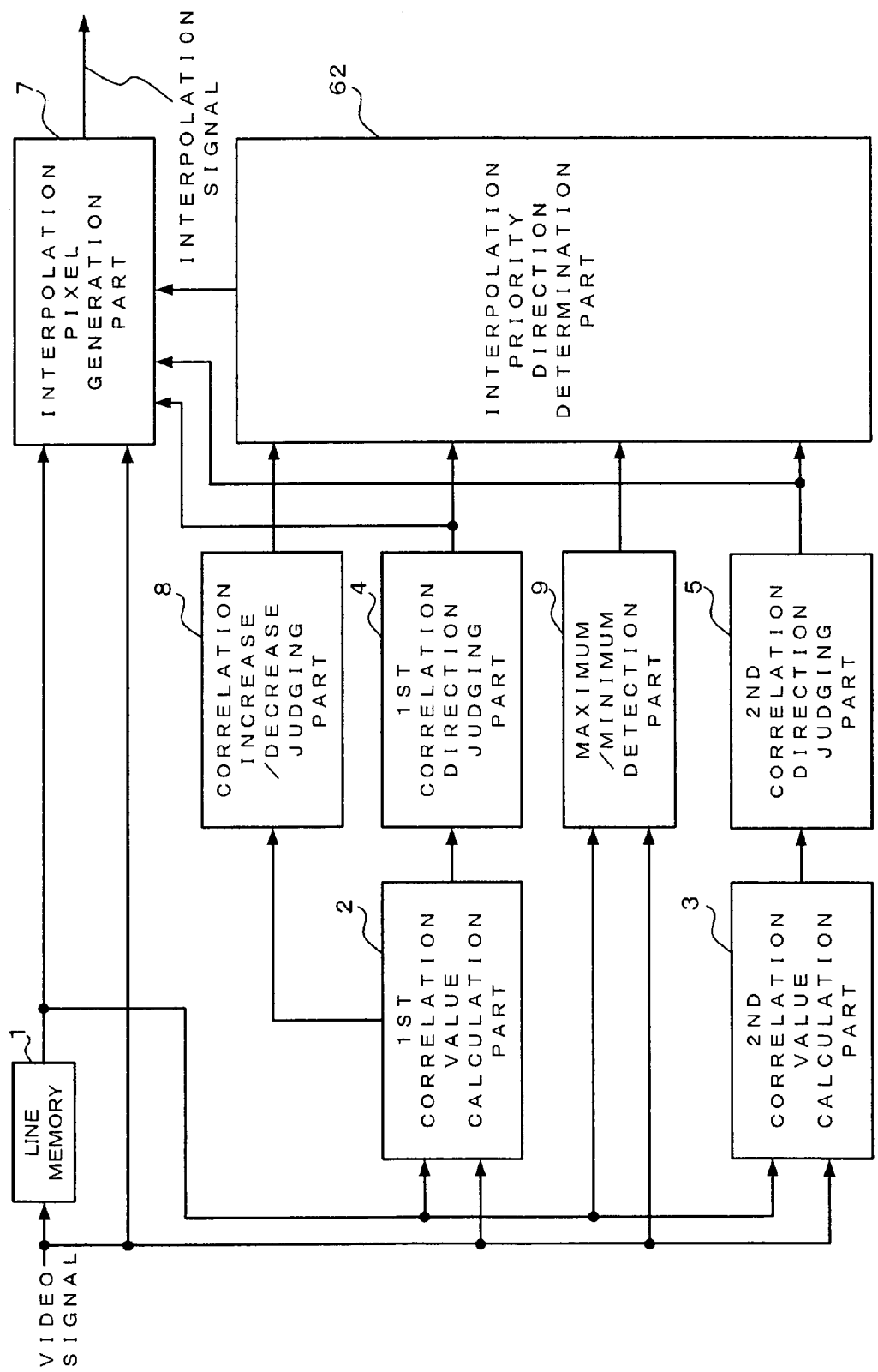
FIG. 8 is a block diagram showing a third embodiment of an interpolation pixel generation circuit according to the present invention.

FIG. 8 is a block diagram showing an example of a composition of an interpolation pixel generation circuit of a third embodiment.

An interpolation pixel generation circuit of the present embodiment adds a maximum/minimum value detection part 9 to the interpolation pixel generation circuit of the second embodiment shown in FIG. 5. An interpolation priority direction determination part 62 further adds the maximum/minimum value detection part 9 to judgment basis, and determines to which interpolation direction priority is given. Then, in FIG. 8, the same reference numeral as FIG. 5 is given to the same block as a block shown in FIG. 5, and the detailed explanation is omitted here.

First, the maximum/minimum value detection part 9 calculates an average of pixel values of correlation judging pair in the correlation direction judged by the first correlation direction judging part 4 as a virtual interpolation value. Next, the maximum/minimum value detection part 9 calculates an absolute value of difference (absolute difference value) between the virtual interpolation value and each pixel value of every pixel on the scanning lines which adjoins the pixel to be interpolated. Finally, when at least one of the absolutely difference values exceeds the predetermined threshold, the maximum/minimum value detection part 9 detects maximum value and minimum value among the virtual interpolation value and the each pixel value of every pixel on the scanning lines which adjoins the pixel to be interpolated.

The interpolation priority direction determination part 62 in the present embodiment first confirms whether the correlation direction judged by the first correlation direction judging part 4 is the large slant direction. Then, when the judgment result of the first correlation direction judging part 4 is the large slant direction, the interpolation priority direction determination part 62 confirms whether the judgment result of the correlation increase/decrease judgment part 8 is monotonic increase or monotonic reduction.

Next, when the judgment result of the correlation increase/decrease judgment part 8 is monotonic increase or monotonic decrease, the interpolation priority direction determination part 62 confirms whether the maximum value or the minimum value detected in the maximum/minimum value detection part 9 is a virtual interpolation value calculated in the maximum/minimum value detection part 9.

And when the maximum value or the minimum value detected in the maximum/minimum value detection part 9 is the virtual interpolation value, the interpolation priority direction determination part 62 determines to give priority to the vertical direction as the interpolation priority direction. In the other cases, the interpolation priority direction determination part 62 determines to give priority to the slant direction as the interpolation priority direction.

Figure 9A:
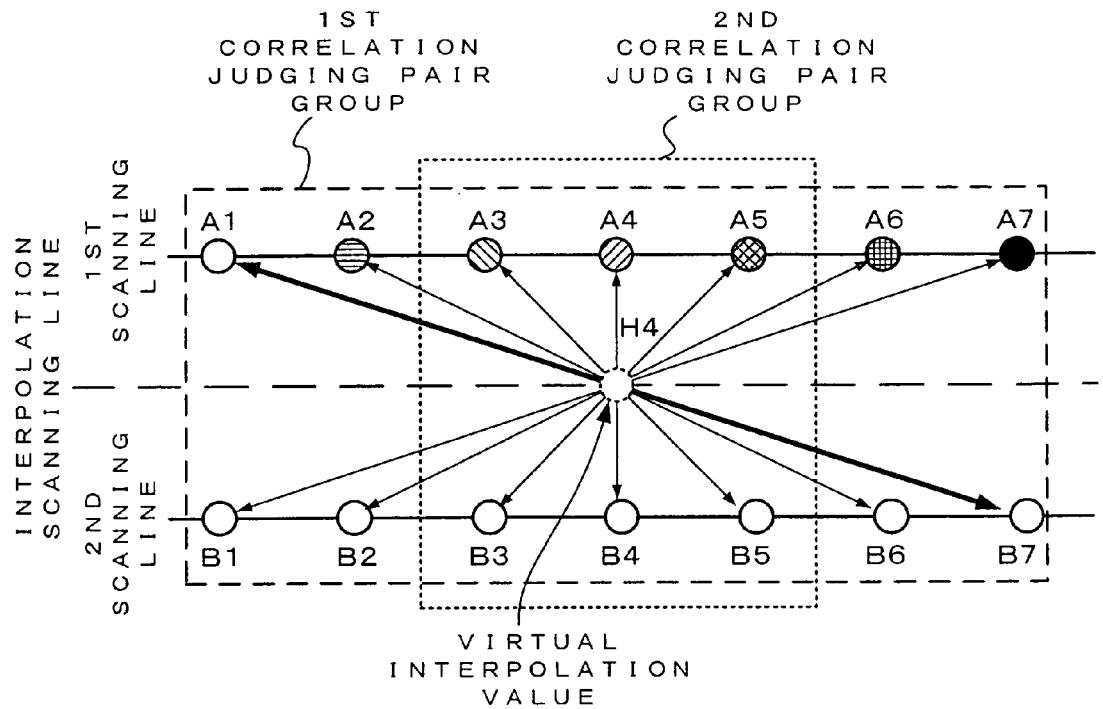
FIG. 9A and FIG. 9B show examples of a correlation pixel generated in the third embodiment.
Figure 9B:
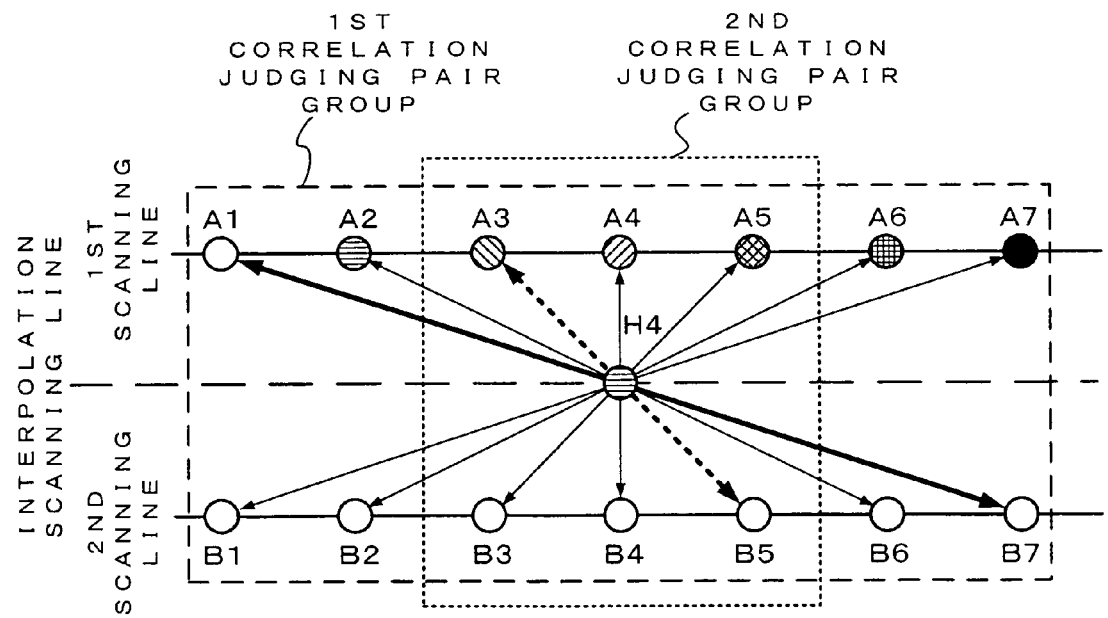

FIG. 9A and FIG. 9B show examples of an interpolation pixel generation by the interpolation pixel generation circuit of the present embodiment.

The combination of pixels shown in FIG. 9A is an example judged as the correlation direction being the large slant direction of the correlation judging pair (A1, B7) by the first correlation direction judging part 4, and judged as the correlation value being monotonic decrease by the correlation increase/decrease judgment part 8.

In this case, a virtual interpolation value calculated in the maximum/minimum value detection part 9 is an average of the pixel values of correlation judging pair (A1, B7). When both pixel A1 and B7 are the highest luminance, the virtual interpolation value is also the highest luminance.

Therefore, the maximum value detected by the maximum/minimum value detection part 9 is the virtual interpolation value. Then, the interpolation priority direction determination part 62 determines to give priority to the vertical direction as the interpolation direction.

When the interpolation priority direction determination part 62 determines to give priority to the vertical direction as the interpolation direction, the interpolation pixel generation part 7 calculates an average of luminance of pixels of the correlation direction judged by the second correlation direction judging part 5, and adopts the average as luminance of the interpolation pixel H4.

Therefore, in the example shown in FIG. 9A, when the correlation direction judged by the second correlation direction judging part 5 is the direction of correlation judging pair (A3, B5), the average value of luminance of the pixel A3 and B5 is adopted as luminance of the interpolation pixel H4. FIG. 9B shows the result of generation of the interpolation pixel H4.

Fourth Embodiment

Figure 10:
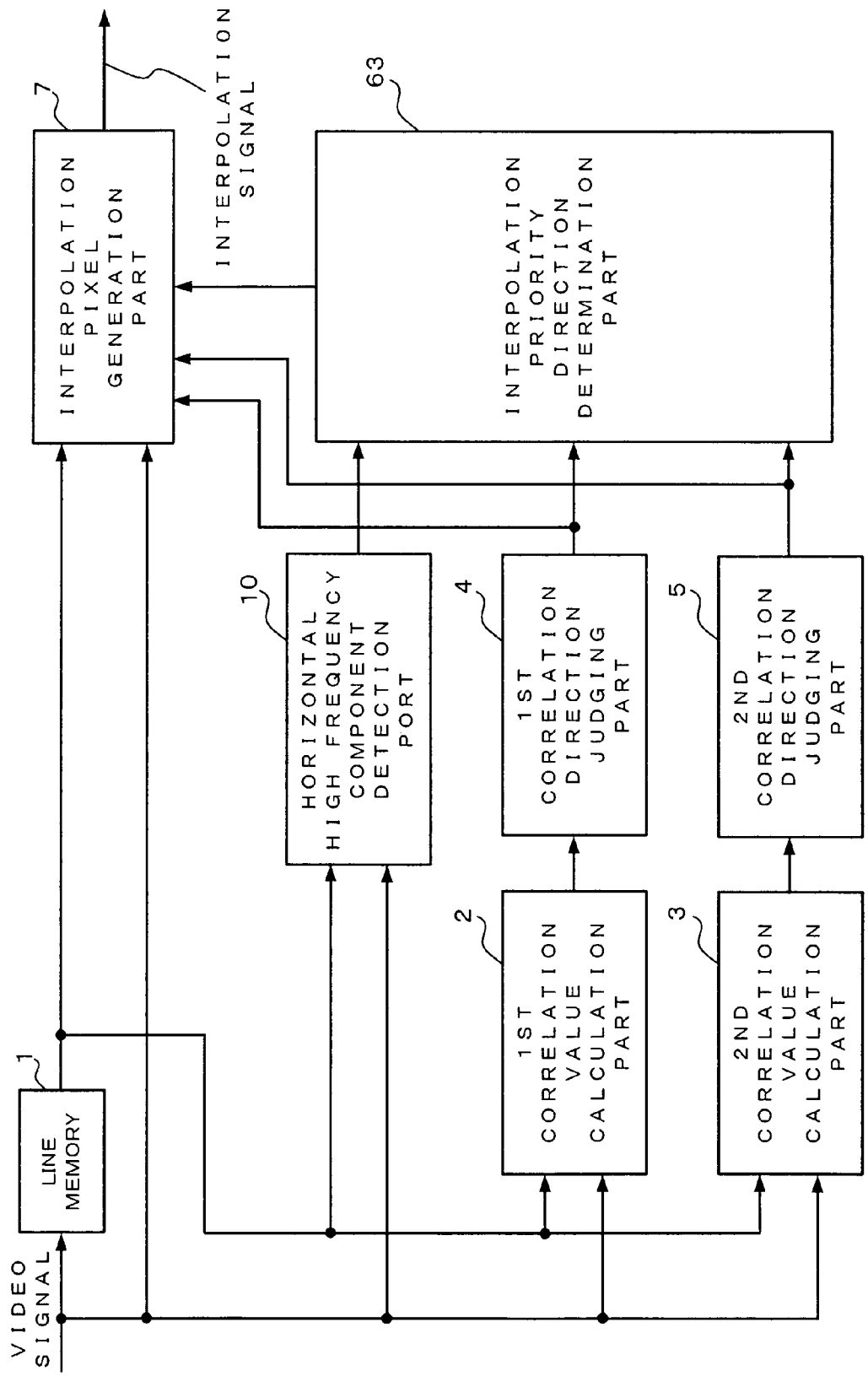
FIG. 10 is a block diagram showing a fourth embodiment of an interpolation pixel generation circuit according to the present invention.

FIG. 10 is a block diagram showing a fourth embodiment of an interpolation pixel generation circuit according to the present invention.

In the present embodiment, a horizontal high frequency component detection part 10 is added to the interpolation pixel generation circuit of the first embodiment shown in FIG. 1. An interpolation priority direction determination part 63 adds further the judgment result of the horizontal high frequency component detection part 10 to judgment basis, and determines to which interpolation direction priority is given. Then, in FIG. 5, the same reference numeral as FIG. 1 is given to the same block as a block shown in FIG. 1, and the detailed explanation is omitted here.

The horizontal high frequency component detection part 10 confirms whether the horizontal high frequency component is contained in each pixel of the first correlation judging pair group, and outputs the number of pixels which detected the horizontal high frequency component.

The interpolation priority direction determination part 63 compares whether the value of the output of the high frequency component detection part 10 exceeds the predetermined value. Generally, when luminance or color of an image changes sharply, a video signal contains the horizontal high frequency component. Therefore, it is considered that change of the luminance among the pixels in the first correlation judging pair group is also larger, as there are many pixels in which the horizontal high frequency component was detected.

When the value of the output of the horizontal high frequency component detection part 10 exceeds a predetermined value, the interpolation priority direction determination part 63 determines to give priority to the vertical direction as the interpolation priority direction. In the other cases, the interpolation priority direction determination part 63 determines to give priority to the slant direction as the interpolation priority direction.

When the interpolation priority direction determination part 63 determines to give priority to the vertical direction as the interpolation direction, the interpolation pixel generation part 7 calculates an average of luminance of pixels of the correlation direction judged by the second correlation direction judging part 5, and adopts the average as luminance of the interpolation pixel H4.

On the other hand, when the interpolation priority direction determination part 63 determines to give priority to the slant direction as the interpolation direction, the interpolation pixel generation part 7 calculates an average of luminance of pixels of the correlation direction judged by the first correlation direction judging part 4, and adopts the average as luminance of the interpolation pixel H4.

Figure 11A:
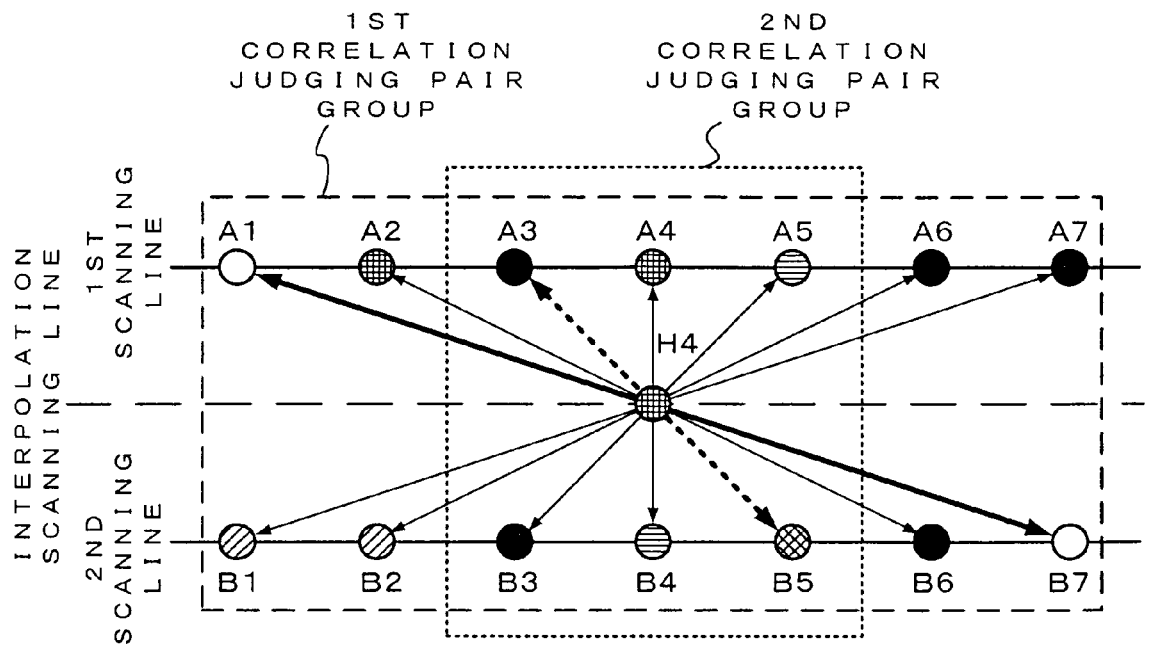
FIG. 11A and FIG. 11B show examples of a correlation pixel generated in the fourth embodiment.
Figure 11B:
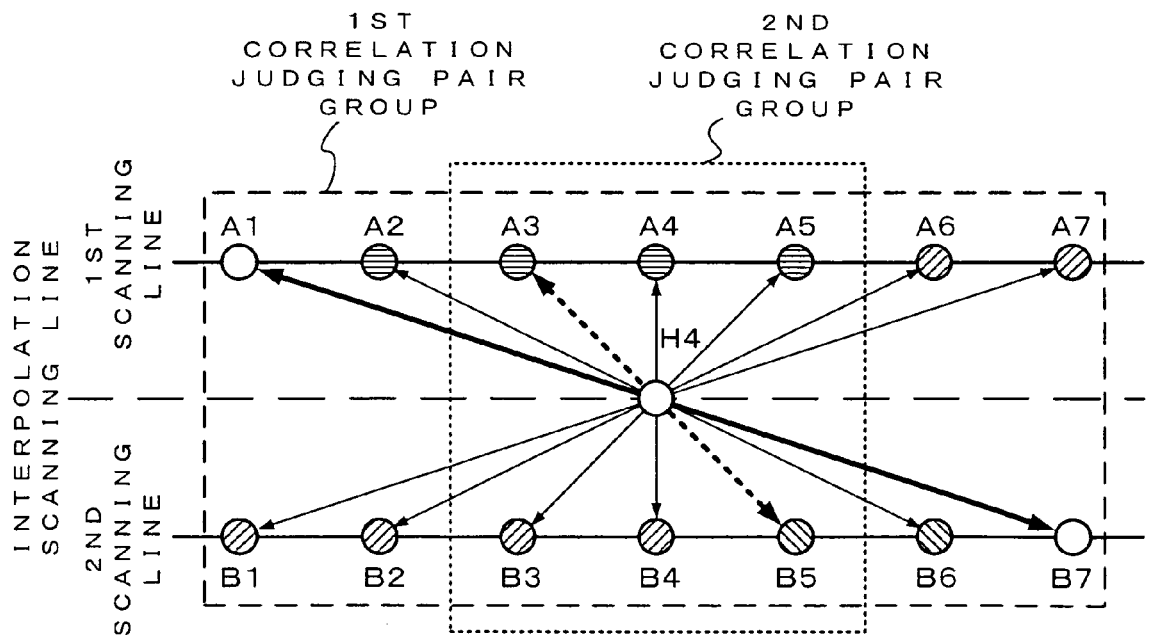

FIG. 11A and FIG. 11B show examples of an interpolation pixel generation by the interpolation pixel generation circuit of the present embodiment.

The example shown in FIG. 11A is a combination of pixels whose number of pixels detected the horizontal high frequency component by the horizontal high frequency component detection part 10 exceeds a predetermined value.

And, in this example, the correlation direction judged by the first correlation direction judging part 4 is the direction of correlation judging pair (A1, B7), and the correlation direction judged in the second correlation direction judging part 5 is the direction of correlation judging pair (A3, B5).

In the case of the example shown in FIG. 11A, since the number of pixels detected the horizontal high frequency by the horizontal high frequency component detection part 10 exceeds a predetermined value, the interpolation priority direction determination part 63 determines to give priority to the vertical direction as the interpolation priority direction. Thus, the interpolation pixel generation part 7 calculates an average of luminance of pixels of the correlation direction judged by the second correlation direction judging part 5, and adopts the average as luminance of the interpolation pixel H4.

The example shown in FIG. 11B is a combination of pixels whose number of pixels detected the horizontal high frequency component by the horizontal high frequency component detection part 10 is less than a predetermined value. And, in this example, the correlation direction judged by the first correlation direction judging part 4 is the direction of correlation judging pair (A1, B7), and the correlation direction judged in the second correlation direction judging part 5 is the direction of correlation judging pair (A3, B5).

In the case of the example shown in FIG. 11B, since the number of pixels detected the horizontal high frequency by the horizontal high frequency component detection part 10 is less than a predetermined value, the interpolation priority direction determination part 63 determines to give priority to the slant direction as the interpolation priority direction.

Thus, the interpolation pixel generation part 7 calculates an average of luminance of pixels of the correlation direction judged by the first correlation direction judging part 4, and adopts the average as luminance of the interpolation pixel H4.

In explanation of each embodiment described above, when a video signal is a luminance signal, a pixel value is explained as luminance. Similarly, when a video signal is a chrominance signal, color can be interpolated as well as luminance by considering that a pixel value is chroma.

Moreover, in explanation of each embodiment, although it explains that an interpolation scanning line is generated between adjoining two scanning lines, the number of scanning lines is not limited to this, but may add further more scanning lines.

What is claimed is:

1. An interpolation pixel generation circuit comprising:
    a first calculation means for calculating a correlation value of each pair of pixels in M pairs (M is an integer) of correlation judgment pixels, said each pair of pixels being symmetric with respect to a pixel to be interpolated, one pixel of said each pair being from a video signal on a previous scanning line, and the other pixel of said each pair being from a video signal on a current scanning line;
    a second calculation means for calculating a correlation value of each pair of pixels in N pairs (N<M, N is an integer) of correlation judgment pixels, said each pair of pixels being symmetric with respect to the pixel to be interpolated, one pixel of said each pair being from the video signal on the previous scanning line, and the other pixel of said each pair being from the video signal on the current scanning line;
    a first judgment means for judging a correlation direction based on the pair of pixels having a high correlation among the correlation values calculated in the first calculation means;
    a second judgment means for judging a correlation direction based on the pair of pixels having a high correlation among the correlation values calculated in the second calculation means;
    an interpolation priority direction determination means for determining an interpolation priority direction among a slant priority direction, a vertical priority direction, and a vertical top priority direction based on said both judgments by the first judgment means and the second judgment means; and
    an interpolation pixel generation means for generating an interpolation pixel having a pixel value which is an average pixel value of a pair of pixels selected for interpolation from the M pairs of correlation judgment pixels and the N pairs of correlation judgment pixels based on the determination of the interpolation priority direction determination means.

2. An interpolation pixel generation circuit according to claim 1, wherein the slant priority direction gives priority to a correlation direction of correlation judgment pixels in a distance far from the pixel to be interpolated, the vertical priority direction gives priority to a correlation direction of correlation judgment pixels in a distance near to the pixel to be interpolated, and the vertical top priority direction gives priority to a direction of pixels located right above and right under of the pixel to be interpolated.

3. An interpolation pixel generation circuit according to claim 1, wherein the interpolation priority direction determination means determines that the interpolation priority direction is the vertical top priority direction, when both a downward-slant-to-the-right direction and an upward-slant-to-the-right direction are contained in the correlation direction judged by the second judgment means, and in other cases, determines that the interpolation priority direction is the vertical priority direction, when both the downward-slant-to-the-right direction and the upward-slant-to-the-right direction are contained in the correlation direction judged by the first judgment means.

4. An interpolation pixel generation circuit according to claim 1, wherein the interpolation pixel generation means selects a pair of correlation judgment pixels having the correlation direction judged by the first judgment means for interpolation when the interpolation priority direction is the slant priority direction determined by the interpolation priority direction determination means.

5. An interpolation pixel generation circuit according to claim 1, wherein the interpolation pixel generation means selects a pair of correlation judgment pixels having the correlation direction judged by the second judgment means for interpolation when the interpolation priority direction is the vertical priority direction determined by the interpolation priority direction determination means.

6. An interpolation pixel generation circuit according to claim 1, wherein the interpolation pixel generation means selects a pair of correlation judgment pixels located right above and right under the pixel to be interpolated when the interpolation priority direction is the vertical top priority direction determined by the interpolation priority direction determination means.

7. An interpolation pixel generation circuit according to claim 1, further comprising:
    a correlation increase/decrease judgment means for judging whether a continuous number of pairs of correlation judgment pixels exceeds a predetermined value, said pairs of correlation judgment pixels exhibiting monotonic increase or monotonic decrease of a correlation value in the M pairs of correlation judgment pixels.

8. An interpolation pixel generation circuit according to claim 7, wherein the interpolation priority direction determination means determines the interpolation priority direction based on the judgment of the correlation increase/decrease judgment means, when the correlation direction is a large slant direction judged by the first judgment means.

9. An interpolation pixel generation circuit according to claim 8, wherein the interpolation priority direction determination means determines the interpolation priority direction by comparing a predetermined value with each difference value which is calculated between the correlation value of the correlation direction judged by the first judgment means and every correlation value of all correlation judging pairs having the large slant direction countering the correlation direction judged by the first judgment means in the M pairs of correlation judgment pixels, when the judgment of the correlation increase/decrease judgment means is neither monotonic increase nor monotonic decrease.

10. An interpolation pixel generation circuit according to claim 9, wherein the interpolation priority direction determination means determines the interpolation priority direction being the vertical priority direction when every difference value is smaller than the predetermined value, and in other cases, determines the interpolation priority direction being the slant priority direction.

11. An interpolation pixel generation circuit according to claim 7, further comprising:
    a maximum/minimum value detection means for calculating an average of pixel values of a pair of the correlation judging pixels in the correlation direction judged by the first judgment means as a virtual interpolation value, calculating an absolute difference value between the virtual interpolation value and each pixel value of every pixel on scanning lines which adjoin the pixel to be interpolated, and detecting a maximum value and a minimum value among the virtual interpolation value and the each pixel value of every pixel on the scanning lines which adjoin the pixel to be interpolated when at least one of the absolute difference values exceeds a predetermined threshold.

12. An interpolation pixel generation circuit according to claim 11, wherein the interpolation priority direction determination means determines the interpolation priority direction based on both the judgment of the correlation increase/decrease judgment means and the detection result by the maximum/minimum value detection means, when the correlation direction is a large slant direction judged by the first judgment means.

13. An interpolation pixel generation circuit according to claim 12, wherein the interpolation priority direction determination means determines that the interpolation priority direction is the vertical priority direction when the judgment of the correlation increase/decrease judgment means is either monotonic increase or monotonic decrease and the maximum or minimum value detected by the maximum/minimum value detection means equals the virtual interpolation value, and in other cases, determines that the interpolation priority direction is the slant priority direction.

14. An interpolation pixel generation circuit according to claim 1, further comprising:
  a horizontal high frequency component detection means for confirming whether horizontal high frequency component is contained in each pixel of the M pairs of correlation judgment pixels, and outputting the number of pixels in which the horizontal high frequency component was detected.

15. An interpolation pixel generation circuit according to claim 14, wherein the interpolation priority direction determination means determines the interpolation priority direction based on the detection result of the horizontal high frequency component detection means.

16. An interpolation pixel generation circuit according to claim 15, wherein the interpolation priority direction determination means determines the interpolation priority direction being the vertical priority direction when the outputted number of the horizontal high frequency component detection means is larger than a predetermined value, and in other cases, determines the interpolation priority direction being the slant priority direction.

* * * * *